E. G. BUSSE.
BRAKE HEAD.
APPLICATION FILED MAY 15, 1908.
1,080,889.
Patented Dec. 9, 1913.
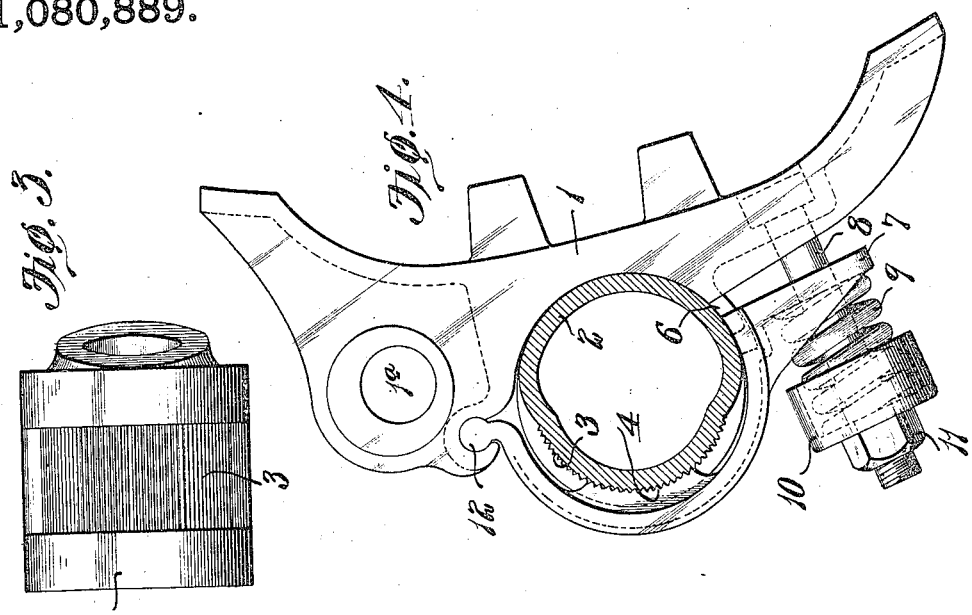
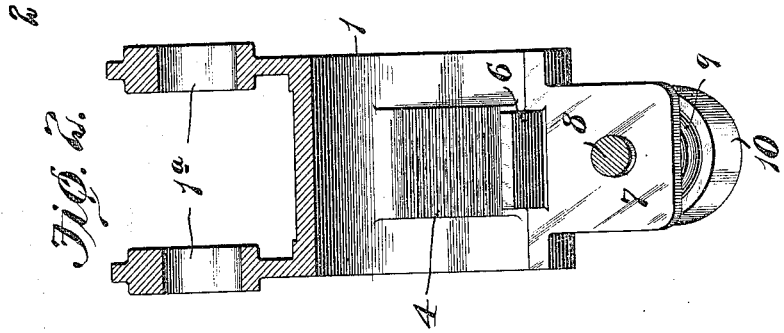
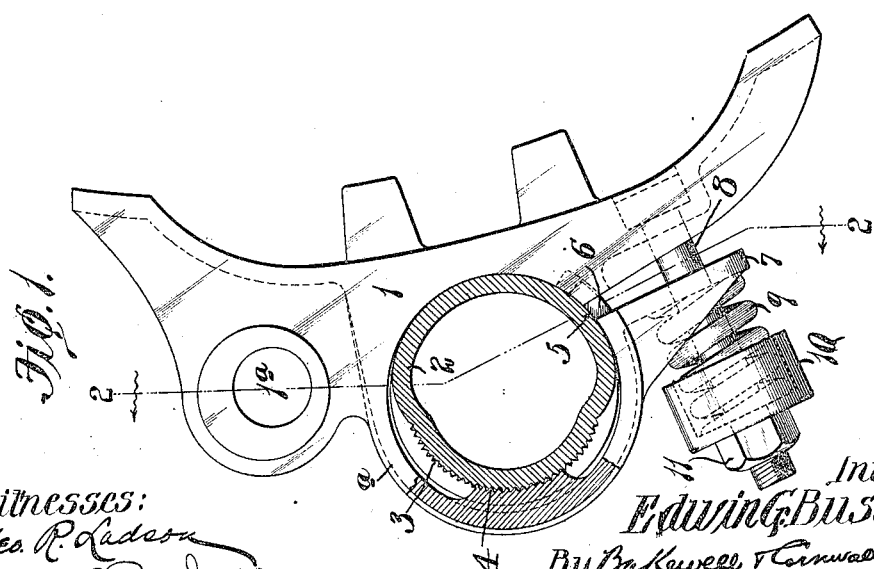
Witnesses:
Geo. R. Ladson
A. J. McCauley
Inventor,
Edwin G. Busse
By Bakewell & Cornwall Attys.

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-HEAD.

1,080,889.   Specification of Letters Patent.   Patented Dec. 9, 1913.

Application filed May 15, 1908. Serial No. 433,058.

*To all whom it may concern:*

Be it known that I, EDWIN G. BUSSE, a citizen of the United States, residing at Chicago, Cook county, Illinois, have invented a certain new and useful Improvement in Brake-Heads, of which the following is a full, clear, and exact description, such as will enable others skilled in the art to which it appertains to make and use the same, reference being had to the accompanying drawings, forming part of this specification, in which—

Figure 1 is a side elevational view, partly in section, of my improved brake head; Fig. 2 is a sectional view on the line 2—2 of Fig. 1; Fig. 3 is an elevational view of the thrust block or that part of the brake beam on which the brake head is mounted; and Fig. 4 is a side elevational view of a modified form of brake head.

This invention relates to a new and useful improvement in brake heads of that character shown in United States Letters Patent granted to Henry B. Robischung, No. 485,823, dated November 8, 1892. In the said Robischung patent there is a thrust block or sleeve having a corrugated reduced portion for coöperating with a spring-pressed locking block, whereby the brake head may be adjusted on the beam.

My present invention contemplates the utilization of the corrugated thrust block or sleeve, but instead of using a removable spring-pressed locking block, I form a serrated engaging surface in the socket of the brake head, which socket receives the thrust block or part of the brake beam on which the brake head is mounted. The socket of the brake head may be split so that one wall thereof is movable, or said socket may be formed in part by a hinged section. In either event, the free end of the wall of the socket is provided with means whereby spring pressure may be exerted thereon for the purpose of forcing said free end inwardly and by so doing causing the serrated engaging surface to yieldingly bear against the serrated surface of the thrust block or part of the brake beam on which the brake head is mounted.

In the drawings, 1 indicates a brake head of the well-known "Christie" type, in which is formed an opening 1ª for the reception of the brake hanger. This brake head is provided with a socket of some suitable shape to receive the brake beam or a part of the brake beam, and in this instance this socket is of circular shape.

2 is a sleeve or socket of the brake beam having a reduced portion in which is formed a serrated or roughened surface 3. According to the construction shown in Fig. 1, the rear wall of the socket in the brake head is formed with a serrated engaging surface 4 coöperating with the surface 3 and locking the brake head in adjusted positions on the beam. The socket of the brake head, shown in Fig. 1, is split at 5 and provided with a tongue 6 bridging the split portion, the free wall of the socket having a lug extension 7 through which passes a bolt 8. The head of bolt 8 is seated in one of the jaws of the brake head, and the outer end of said bolt is surrounded by a spring 9 seated in a cup-shaped follower 10 against which bears a nut 11. To remove the brake head from the beam it is only necessary to unscrew the nut 11, when that part of the socket wall approximately at the point marked *a* acts as a hinge enabling the free end of the socket wall to be moved outwardly so as to disengage the locking surface 4 from the surface 3 of the thrust block, enabling the brake head to be removed from the beam or adjusted on the beam, as the case may be.

By screwing down the nut 11, after the brake head has been adjusted in proper position on the beam, it will be noticed that the spring 9 exerts a yielding pressure on the socket wall and tends to support the brake head in position, causing the thrust block to be seated against the forward face of the socket opening in the brake head. The direction in which the locking surface 4 is directed against the locking surface 3 so as to seat the thrust block against the forward face of the socket in the brake beam is, I consider, important, as it prevents the existence of a clearance space at this point, and consequently when the brake is applied no lost motion has to be taken up in the form of clearance space.

In Fig. 4 I have shown a modified form in which the rear wall of the socket opening instead of being integral with the brake head is in the form of a separate piece having a hinge connection with the brake head. This hinge is of such construction that when the tongue 6 is out of engagement with its groove, the rear wall of the socket may be removed laterally, but when the parts are assembled and the tongue 6 is in its seat lateral motion of the rear wall is prevented. The hinge connection between the rear wall of the socket is indicated at 12 in Fig. 4. It is obvious that by screwing up the nut 11 until the spring 9 is made solid, or nearly so, the locking block or face will be so firmly pressed against the serrations on the sleeve that the head will be rigidly held against rotation.

I am aware that minor changes in the construction, arrangement and combination of the several parts of my device can be made and substituted for those herein shown and described without in the least departing from the nature and principle of my invention.

Having thus described the invention, what is claimed as new and desired to be secured by Letters Patent is:

1. A brake head provided with a socket, one wall of which socket is yielding, and means integral with said yielding wall for engaging the brake beam and securing said brake head in position thereon; substantially as described.

2. A brake head provided with a socket, one wall of which socket is yielding, and means integral with said yielding wall for holding said brake head against circumferential displacement on the beam; substantially as described.

3. A brake head provided with a socket, one wall of which socket is yielding, and means integral with said yielding wall for adjustably holding said brake head in adjusted position on the beam; substantially as described.

4. A brake head provided with a socket, one wall of which socket is yielding, means integral with said yielding socket wall for securing the brake head in position on the beam, and means coöperating with said yielding socket wall for moving said wall; substantially as described.

5. A brake head having a hinged socket wall, locking means carried by said hinged socket wall, and means for forcing said hinged socket wall inwardly; substantially as described.

6. A brake head having a hinged socket wall, locking means carried by said hinged socket wall, and yielding means for forcing said hinged socket wall inwardly; substantially as described.

7. The combination with a brake beam having a serrated surface, of a brake head having a socket, the wall of said socket being provided with a locking face, and means for exerting pressure on the wall of said socket for causing said locking face to engage said serrated surface; substantially as described.

8. The combination of a serrated sleeve or thrust block, a break head having a socket to receive said sleeve or thrust block, one wall of said socket being yielding and having a serrated engaging portion, and means for forcing said yielding socket wall inwardly; substantially as described.

9. A brake head having a split socket, the free wall of which is provided with a locking surface, and means for moving said free wall inwardly; substantially as described.

10. A brake head having a socket one wall of which is yielding and provided with locking means, a spring coöperating with said yielding wall to force it inwardly, and means for regulating the pressure of said spring; substantially as described.

11. A brake head having a socket, one wall of which is hinged, and means for exerting pressure against said hinged wall; substantially as described.

12. A brake head having a socket formed in part by a section having a hinge connection with the brake head; substantially as described.

13. A brake head having a socket formed in part by a section having a hinge connection with the brake head, and means for moving said hinged section; substantially as described.

14. A brake head having a socket formed in part by a section having a hinge connection with the brake head, locking means carried by said hinged section, and means for exerting pressure on the free end of said hinged section; substantially as described.

15. The combination of a brake beam, a brake head mounted on said beam, and means for yieldingly holding said head against rotation on said beam, said means being also adapted to rigidly hold said head against rotation.

16. The combination of a brake beam, a brake head mounted on said beam, a head locking member, carried by one of said parts, means for moving said member into engagement with the other of said parts, and yielding means interposed between said moving means and said member.

17. The combination with a brake beam, of a brake head mounted thereon for rotatable adjustment and provided with a bearing of two-part clasp-like construction, substantially inclosing the end of the beam, one of said parts being pivoted to the other, and means for clamping said parts upon the beam.

18. The combination with a brake beam, of an adjustable brake head mounted thereon and provided with a bearing of two-part construction, one of said parts being movably mounted upon the other, opposed socket members carried by the respective parts of said bearing, a locking bolt extending through said socket members and an expansion spring acting on said bolt.

19. The combination with a brake beam provided with a bearing sleeve, of an adjustable brake head having a bearing of two-part construction mounted on said sleeve, one of said parts being pivoted to the other, and means for clamping said parts upon said sleeve.

20. The combination with a brake beam, of an adjustable brake head mounted thereon and having a bearing of two-part construction, one of said parts being movably connected to the other, opposed socket members carried by the respective parts of said bearing and spaced apart when in locked position, a bolt extending through said socket members for uniting the latter, and a coiled expansion spring in one of said socket members and acting on the bottom of the socket and head of the bolt to draw the brake-head parts together.

21. The combination with a brake beam, of a brake head mounted thereon and having a bearing of two-part construction, said parts being pivotally connected together and spaced apart when in clamped position, means for clamping said bearing upon the beam, and means automatically tending to draw said parts together.

22. The combination with a brake beam, of a brake head, having a brake beam eye of divided construction, fitting upon said beam, and a spring holding the eye clamped frictionally upon the inserted part of the beam.

23. The combination with a brake beam, of an adjustable brake head mounted thereon and provided with a split bearing and a spring acting on said bearing to automatically clamp it to the brake beam.

24. The combination with a brake beam, of an adjustable brake head mounted thereon and provided with a bearing taking the form of an open ring, an opposed socket member carried by said bearing, and means for automatically clamping the bearing to the beam.

25. The combination with a brake beam, of an adjustable brake head mounted thereon and provided with a split bearing, opposed socket members carried by the bearings, a locking bolt extending through said socket members, and an extension spring acting on said bolt to automatically clamp the bearing to the head.

26. The combination with a brake beam, of a brake head mounted thereon and having a split bearing, and means for automatically clamping the bearing to the head.

27. In a brake beam, the combination of a part on which the brake head is mounted, holding means pivotally mounted on the head, and means for yieldingly pressing said holding means against the part of the beam on which the head is mounted.

28. The combination with a brake beam having a sleeve whose periphery is grooved on one side only, a brake head, and means formed on a wall of the head and fitting in said groove for preventing axial movement of said head.

29. The combination with a brake beam having a sleeve whose periphery is grooved on the rear face thereby affording a broad bearing on the front face of said sleeve, a brake head, and means carried by the head and fitting in said groove for preventing axial movement of said head.

30. In a brake beam the combination of a support, a brake head rotatably adjustable on said support, means in the head for preventing axial displacement, and means for rigidly clamping the head upon said support in its adjusted position by tension.

31. In a brake beam the combination of a support, a brake head rotatably adjustable upon said support, and means for rigidly locking the head in its adjusted position by tension.

32. In a brake beam the combination of a circumferentially grooved sleeve, a head rotatably adjustable on said sleeve, means carried by the head and fitting within the groove of said sleeve to prevent axial displacement, and tension means for rigidly clamping the head in position on the sleeve.

33. In a brake beam the combination of a sleeve having a groove in its rear face, a brake head rotatably mounted upon said sleeve and having locking means coöperating with the bottom wall of said groove whereby the brake head may be rigidly locked in adjusted positions on the sleeve, and means for exerting pressure upon said locking means whereby the front wall of the sleeve is forced against the front wall of the brake head socket.

34. A brake head having a clamping arm, and a spring to act upon said arm to cause it to clamp a brake beam when seated thereon.

35. A brake head having a hub; a clamping arm at one side of said hub; a spring bearing at one end against the clamping arm; a bolt engaging the brake head; and means on said bolt engaging the other end of said spring.

36. A brake beam comprising a sleeve having peripheral teeth, and a brake head having a hub adapted to fit over said sleeve, said brake head having a clamping arm extending part way around said sleeve, said arm being toothed to engage the toothed surface of said sleeve.

37. A brake head having a clamping arm, and means yieldably engaging said arm to move it, said means being operable to positively clamp said arm.

38. A brake head having a clamping arm, and means acting upon said arm comprising a bolt, a spring engaging said bolt and tending to move said arm, said bolt being operable to compress said spring and positively clamp said arm.

39. A brake head having a clamping arm, an angular portion at one end of said arm, a web on the brake head adjacent to said angular portion, a bolt extending through said web and said angular portion, and a spring acting upon said bolt and tending to move said clamping arm, said bolt being operable to compress said spring and positively clamp said arm.

40. In a brake beam, the combination of a sleeve having a corrugated periphery, a brake head fitting on said sleeve, said head having a spring clamping arm extending therefrom, said arm having corrugations on its inner side adapted to engage corrugations on said sleeve and means for moving said arm.

41. In combination with a brake beam having a grooved sleeve thereon, a brake head therefor having a strap or band held at one end to the head, and means for drawing the strap or band at its other end for closing the middle portion of the same into the groove of the sleeve and securing the head on the sleeve.

42. In combination with a brake beam having a grooved sleeve thereon, a brake head therefor having a strap or band socketed at one end in said head, and means for drawing the strap or band at its other end for closing the middle portion of the same into the groove of the sleeve and securing the head on the sleeve.

43. A brake head comprising a longitudinally split hub, a pair of webs extending outwardly from said hub adjacent the split, means tending to draw said webs together, and separate means for positively drawing said webs together.

44. A brake beam comprising a sleeve having a roughened periphery, a brake head having a hub adapted to fit on said sleeve, the interior of said hub being roughened to engage the roughened portion of said sleeve, said hub having a split longitudinally through its wall, a pair of webs extending outwardly from said wall adjacent said split, and means tending to draw said webs together, the interior of said hub being of slightly less diameter than said sleeve.

45. In combination with a brake beam having a sleeve thereon presenting at its outer or rear side a groove and at its opposite side a smooth bearing surface, a brake head on said sleeve having a strap or band held at one end to the head, and means for drawing the strap or band at its other end for closing the middle portion of the same into said groove and binding the head against said bearing surface.

In testimony whereof I hereunto affix my signature in the presence of two witnesses, this 19th day of October 1907.

EDWIN G. BUSSE.

Witnesses:
E. T. WALKER,
E. B. LEIGH.

Copies of this patent may be obtained for five cents each, by addressing the "Commissioner of Patents, Washington, D. C."